Aug. 5, 1958     W. E. GREENAWALT     2,846,301
PROCESSES OF SMELTING FINELY DIVIDED METALLIC ORE
Filed Aug. 29, 1956
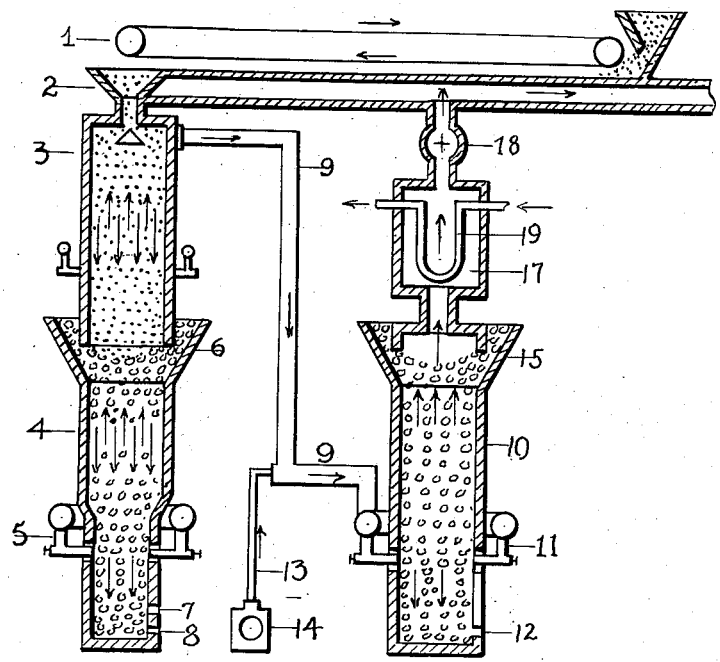
INVENTOR.
William E. Greenawalt

United States Patent Office

2,846,301
Patented Aug. 5, 1958

2,846,301

PROCESSES OF SMELTING FINELY DIVIDED METALLIC ORE

William E. Greenawalt, Denver, Colo.

Application August 29, 1956, Serial No. 606,875

9 Claims. (Cl. 75—40)

My invention relates to improvement in processes of smelting finely divided metallic ore; principally to iron and copper ores, such as concentrate obtained from milling ore too low grade to be profitably smelted direct.

The concentrate is usually obtained by gravity, flotation, or magnetic separation. In smelting iron ore, the concentrate is usually pelletized and then sintered into semi-fused lumps, and charged into the blast furnace. In copper smelting the concentrate is usually charged wet, which is costly and highly inefficient. It is evident that a great saving could be effected if the finely divided concentrate could be smelted direct by showering the ore through a highly heated atmosphere of a furnace to convert the metal in the ore into metallic form. But such a treatment involves a dust problem which is disastrous, and which has never been satisfactorily solved. The present process is an effort in that direction.

The process will be described more particularly with reference to iron ore. Referring to the accompanying drawing: The ore is dried in the drier 1, and delivered into the hopper 2, from which it is fed in a continuous stream into the highly heated atmosphere of a melting furnace 3 in the upper part of a vertical shaft, to melt it, and drops in showered form into the smelting furnace 4 in the lower part of the vertical shaft, which is filled with highly heated carbon, usually coke. The melting furnace and the smelting furnaces are so arranged that the ore, showered in a continuous stream through the melting furnace 3, will be delivered in showered form into the smelting furnace 4, and percolates downwardly through the highly heated and highly concentrated permeable column of carbon to convert the metal of the ore into a molten metal product, such as pig iron or copper matte. The mixture of molten metallic product and slag flows into the smelting furnace hearth, where the molten metal product is separated from the molten slag. The slag flows out through the slag hole 7 and the molten metal product through the tap hole 8. Air is delivered into the smelting furnace by means of the tuyeres 5. Carbon is delivered into the smelting furnace through the feeders 6.

The smelting furnace gas, consisting principally of CO, $CO_2$, and nitrogen, passes upwardly through the highly heated column of carbon, at a temperature of 2300 deg. F. or over, into the hot, usually oxidizing, atmosphere of the melting furnace, where the CO is burned to $CO_2$ with the production of heat.

The hot gas from the melting furnace, consisting principally of $CO_2$, nitrogen, and varying amounts of dust, flows through the duct 9 and the tuyeres 11 into a coalescing chamber 10 to coalesce the hot molten dust into liquid form, after which it is smelted to separate the metal from the slag. The temperature of the coalescing chamber is kept safely above the melting point of the dust, or about 2200–2300 deg. F. This is done by injecting a small amount of free air with the melting chamber gas to combine with a combustible within the coalescing chamber to maintain the required heat; but since the melting chamber gas enters the coalescing chamber at about 2000 deg. F., the only additional heat required is that to raise its temperature to about 2300 deg. F. The free oxygen may be supplied through an excess of air in the melting furnace exhaust gas, or it may be injected into the stream of gas by means of a blower 14.

Since the primary object of the coalescing chamber is to coalesce the molten dust into liquid form, the coalescing chamber may be filled with any solid easily permeable substance, such as coke, hard coal, lumps of ore, refractory brick, or clay balls, or a mixture of any or all of them to maintain the dust at an easy flowing temperature. In smelting iron ore the coalescing chamber will usually be filled with lumps of coke or hard coal, and just enough air introduced with the melting furnace gas, or otherwise, to maintain the temperature above the melting point of the dust. The iron oxide dust, under such conditions, might be reduced and converted into pig iron and slag. The amount of dust is small compared with the total ore, and the results desired can be controlled by the operator. The principal object would be to remove the dust from the melting furnace gas and recover it in usable form. The coke, coal, or other filling material is fed into the coalescing chamber 10 through the feeder 15. The molten product is removed from the coalescing chamber through the tap hole 12. The coalescing chamber gas, freed from dust, at a temperature of about 2000 deg. F., flows into the heat exchanger 17, through which fresh air is flowed through the pipe 19, and delivered to other steps of the process. The gas from the heat exchanger is delivered, by means of the blower 18, into the drier to dry fresh ore.

The process is much the same applied to copper ore as to iron ore, but the chemistry is different. Copper concentrate is usually in the form of copper-iron sulphide, which for illustration purposes might be assumed to contain 30 percent copper, 32 percent iron, and 35 percent sulphur, per ton of ore. The sulphur may be eliminated to any extent in the oxidizing atmosphere of the melting furnace to produce the desired matte. If it is desired to eliminate 25 percent, or 500 pounds of sulphur per ton of ore, in smelting to matte, a large amount of heat would be produced, or about 2,000,000 B. t. u., which is enough to melt the ore, but not enough to complete the smelting. Only a small amount of carbonaceous fuel, such as petroleum, powdered coal, or natural gas, will usually be necessary to maintain the melting furnace at the temperature to instantly flash the sulphides. The molten ore, freed from the melting chamber gas, is delivered in showered form into the smelting furnace 4, where it is smelted to produce matte and slag. The hot melting chamber gas, consisting principally of sulphur dioxide, carbon dioxide, nitrogen, and dust, flows through the duct 9 into the coalescing chamber 10, where the dust is converted into liquid form as matte and slag, and is withdrawn through the tap hole 12. The coalescing chamber gas, freed from dust, flows through the heat exchanger 17 into the drier 1 to heat fresh ore. Only a comparatively small amount of carbonaceous fuel is required, because the heat produced in burning the sulphur in the melting furnace follows through the entire process.

In smelting copper sulphide ore to matte, a reverberatory furnace may be substituted for a blast furnace; in which case it would not be necessary to pass the molten ore from the melting furnace through a column of carbon in the smelting furnace.

The liquified dust from the coalescing chamber may be converted into any convenient form for further treatment, depending on the ore and the results desired. In iron ore smelting it may take the form of solid liquified dust or of pig iron and slag. In copper smelting it will usually be in the form of any desired grade matter.

This application is a continuation-in-part of my two copending applications, Serial No. 502,969, filed April 21, 1955, now U. S. Patent No. 2,784,077, and Serial No. 530,227, filed August 24, 1955, now U. S. Patent No. 2,784,078.

I claim:

1. A process of smelting finely divided iron ore comprising, showering the ore through the highly heated atmosphere of a melting furnace in the upper part of a vertical shaft to melt it, delivering the unreduced molten ore in showered form, separated from the melting furnace gas, from the melting furnace into a highly heated permeable column of carbon in a smelting furnace in the lower part of the vertical shaft to smelt it, passing the hot exhaust gas from the smelting furnace into and through the showered ore in the melting furnace, passing the mixture of hot melting furnace gas and dust separated from the molten ore into and through a highly heated permeable column of solid material in a coalescing chamber to coalesce the molten dust particles into liquid form, and separating the molten liquified dust from the melting furnace gas.

2. A process of smelting finely divided iron ore comprising, showering the ore through the highly heated atmosphere of a melting furnace in the upper part of a vertical shaft to melt it, delivering the unreduced molten ore in showered form, separated from the melting furnace gas, from the melting furnace into a highly heated column of carbon in a smelting furnace in the lower part of the vertical shaft to smelt it, injecting air into the column of carbon in the smelting furnace, passing the hot exhaust gas from the smelting furnace into and through the showered ore in the melting furnace, passing the mixture of hot melting furnace gas and dust separated from the molten ore through a highly heated permeable column of solid material to coalesce the molten dust into liquid form, and separating the molten liquified dust from the melting furnace gas.

3. A process of smelting finely divided metallic ore comprising, showering the ore through the highly heated atmosphere of a melting furnace in the upper part of a vertical shaft to melt it, delivering the molten ore in showered form, separated from the melting furnace gas, from the melting furnace into a highly heated permeable column of carbon in the lower part of the vertical shaft to smelt it, passing the hot exhaust gas from the smelting furnace into and through the showered ore in the melting furnace, passing the mixture of hot melting furnace gas and dust separated from the molten ore from the melting furnace into and through a highly heated permeable column of solid material in a coalescing chamber to coalesce the molten dust into liquid form, and separating the molten liquified dust from the melting furnace gas.

4. A process of smelting finely divided metallic ore comprising, showering the ore through the highly heated atmosphere of a melting furnace to melt it, delivering the molten ore separated from the melting furnace gas into a smelting furnace to smelt it, passing the mixture of hot melting furnace gas and dust from the melting furnace separated from the molten ore into and through a highly heated permeable column of lump material in a coalescing chamber to coalesce the molten dust particles into liquid form, and separating the liquified dust from the melting furnace gas.

5. A process of smelting finely divided metallic ore comprising, showering the ore through the highly heated atmosphere of a melting furnace to melt it, delivering the molten ore separated from the melting furnace gas into a smelting furnace to smelt it, passing the mixture of hot melting furnace gas and dust from the melting furnace separated from the molten ore through a highly heated permeable column lump material to coalesce the molten dust particles into liquid form, separating the liquified dust from the coalescing chamber gas, and heating fresh ore with the dust-eliminated gas from the coalescing chamber.

6. A process of smelting finely divided metallic ore comprising, showering the ore through a highly heated atmosphere of a melting furnace to melt it, delivering the molten ore separated from the melting furnace gas into a smelting furnace to smelt it, passing the mixture of hot melting furnace gas and dust from the melting furnace mixed with a regulable amount of free air through a highly heated permeable column of lump material containing a combustible to coalesce the molten dust particles into liquid form, and separating the liquified dust from the melting furnace gas.

7. A process of smelting finely divided metallic ore comprising, showering the ore through the highly heated ascending atmosphere of a melting furnace to melt it, delivering the molten ore separated from the melting furnace gas into a smelting furnace to complete the smelting and separate the molten metallic product from the molten slag, passing the mixture of hot melting furnace gas and dust separated from the molten ore through a highly heated permeable mass of lump material to coalesce the molten dust particles into liquid form, and separating the liquified dust from the melting furnace gas.

8. A process of smelting finely divided metallic ore comprising, showering the ore through the highly heated atmosphere of a melting furnace, delivering the molten ore in showered form separated from the melting furnace gas into a smelting furnace to complete the smelting and separate the molten metal product from the molten slag, passing the mixture of melting furnace gas and dust separated from the molten ore through a highly heated permeable mass of lump material to coalesce the molten dust particles into liquid form, separating the coalesced dust product from the melting furnace gas, and adding the coalesced dust product to the molten ore product for further treatment.

9. A process of smelting finely divided iron oxide ore comprising, showering the ore through the highly treated atmosphere of a melting furnace, delivering the molten ore in showered form separated from the melting furnace gas into a smelting furnace to complete the smelting and separate the molten iron from the molten slag, passing the mixture of hot melting furnace gas and dust separated from the molten ore through a high heated permeable mass of lump material to coalesce the dust particles containing unreduced iron into liquid form, separating the coalesced dust product from the melting furnace gas, and subjecting the coalesced dust product to further treatment to complete the reduction of iron oxide to metallic iron.

References Cited in the file of this patent

UNITED STATES PATENTS

| | | |
|---|---|---|
| 55,710 | Reese | June 19, 1866 |
| 943,599 | Hubbard | Dec. 14, 1909 |
| 1,775,713 | Baily | Sept. 16, 1930 |
| 2,321,310 | Moore | June 8, 1943 |
| 2,781,255 | Krivsky et al. | Feb. 12, 1957 |
| 2,784,077 | Greenawalt | Mar. 5, 1957 |